Patented Aug. 26, 1952

2,608,466

UNITED STATES PATENT OFFICE 2,608,466

PROCESS FOR PREPARING ACTIVE FORM OF MANGANESE DIOXIDE

Abraham L. Fox, Washington, D. C., assignor to Reginald S. Dean, Washington, D. C.

No Drawing. Application December 15, 1948, Serial No. 65,540

4 Claims. (Cl. 23—145)

This invention relates to an active form of manganese dioxide and processes for preparing it. It has for its aim the provision of a new form of manganese dioxide having properties making it especially suitable for use as a depolarizer in dry cells, for the oxidation of organic chemical compounds and for other purposes.

The manganese dioxide of this invention is especially suitable for use in dry cells of the Le Clanche type. This arises from the fact that it combines a higher electrical conductivity than heretofore known with great reactivity as revealed by initial capacity and high stability as revealed by long shelf life of batteries.

The method which I employ for the manufacture of the improved battery oxide of this invention starts in all cases with the preparation of a fully crystalline precipitated manganese carbonate having a crystal size from 0.25 micron to 6 microns average diameter. The oxidation of manganese carbonate has been heretofore employed for the manufacture of battery oxide but with indifferent results. It is important that the precipitated carbonate be free from amorphous material and have the crystal structure of rhodocrosite, the individual crystals being within the size range stated. Such manganese carbonate will not appreciably darken in air at room temperatures even when stored over long periods. Manganese carbonate precipitates of finer crystal size darken when stored in air and coarse particles, such as may be made by grinding natural rhodocrosite, do not oxidize readily enough on heating. I prefer to make the manganese carbonate for the practice of my invention from complex ammoniacal solutions in the manner which will be set forth later. Any manganese carbonate meeting the herein stated requirements may, however, be satisfactorily used. The manganese dioxide produced by the practice of my invention will have the same particle size as the crystal size of the manganese carbonate from which it is made.

In the practice of my invention I take this manganese carbonate and heat it in air within the temperature range 300°–600° F. for a sufficient time to produce a product containing from 50–70% $MnO_2$.

The time necessary to accomplish this result depends on the temperature. At 600° F. it is about 2 hours and at 300° F. it is about 15 hours. Heating for an additional time has very little effect on the oxide.

The following examples are given as illustrative of this embodiment of my invention.

Example I

I take 100 grams of manganese carbonate having a composition manganese 44.3%, carbon dioxide 43.6%, water 7.26%. Examination under polarized light shows that all particles are crystalline. X-ray spectrometry shows only the lattice parameters of rhodocrosite and examination with the electron microscope shows polyhedral crystals of an average diameter of 2 microns. This material is pink in color and stable in air at room temperature. The manganese carbonate is heated in air to 570° F. and the material analyzed at several periods with the following results:

| Time (min.): | Per cent $MnO_2$ |
|---|---|
| 10 | 40 |
| 60 | 53 |
| 120 | 63 |
| 180 | 65 |

Examination of the product under the electron microscope shows the product to have a particle size of 2 microns average diameter.

Example II

I take 50 grams of manganous carbonate having completely crystalline particles 0.25 micron in diameter. This material is pink in color and stable in dry air. The manganese carbonate is heated to 300° F. in air and the material analyzed at several periods with the following results.

| Time (hours): | Per cent $MnO_2$ |
|---|---|
| 1 | 18 |
| 2 | 37 |
| 8 | 52 |
| 14 | 64 |

Examination of the product under the electron microscope shows the particle size to be that of the crystals of the carbonate used, namely, about 0.25 micron.

Example III

I take 100 grams of manganese carbonate precipitated from a complex manganese ammonia solution in accordance with the procedure described later herein. This material is fully crystalline and has a grain size of 2 microns diameter. I filter but do not wash this material so that it is saturated with ammonia and ammonium carbonate. This material is dried in air and turns black. It is then heated in air at 470° F. for 24 hours. The resulting product analyzes 64% $MnO_2$. It differs from the products of the preceding examples, however, in that the particle size of the manganese dioxide is no longer that of the original manganese carbonate crystals but is very much smaller, being in this instance only 0.25 micron.

To increase the $MnO_2$ content of the products of the foregoing examples I find that they may be leached with dilute acids which form soluble manganese salts such as sulphuric or nitric acids or with ammonium salts of such acids which dissolve MnO, such as ammonium chloride or sulphate. After such leaching the $MnO_2$ is washed with water until after boiling one gram with 100 cc. of water, a pH of more than four is reached. This requires exhaustive washing. The following examples are given as illustrative of this embodiment of my invention.

Example IV

I take 100 grams of precipitated manganese carbonate, fully crystalline, stable in air and having an analysis of manganese 44.4%, carbon dioxide 43.7%, water 7.0% and a crystal size as determined with the electron microscope of 3 microns average diameter. I heat this material in air at 300° F. for 8¼ hours. At this time it analyzes 53.0% $MnO_2$. This material is vigorously boiled with a 10% solution of $NH_4Cl$ containing three times the amount of $NH_4Cl$ necessary to combine with the unreduced manganese oxide and liberate ammonia. After this leaching treatment, the material is washed, dried and assayed. It contains 79.0% $MnO_2$.

Example V

I take 100 grams of manganese carbonate prepared by decomposition of complex ammonia manganese carbonate solution by coiling, and having a crystal size of 2 microns, and heat in air for 24 hours at 475° F. This product analyzes:

| | Per cent |
|---|---|
| $MnO_2$ | 69.0 |
| Mn | 59.3 |
| MnO | 20.3 |

State of oxidation $MnO_{1.735}$.

This material is leached with enough 10% $H_2SO_4$ to combine with the MnO. The leached product is filtered, washed and dried. It contains by analysis:

| | Per cent |
|---|---|
| $MnO_2$ | 87.4 |
| Mn | 60.5 |
| MnO | 6.8 |

State of oxidation $MnO_{1.91}$.

I have found that the unoxidized manganese oxide in the oxidized product may be converted to carbonate by treating in a water slurry with $CO_2$. This carbonated product may be further oxidized by heating in the same temperature range as before, with the result that the manganese is further oxidized.

This procedure may be repeated a number of times with an increase in the $MnO_2$ at each step. This increase is approximately 40% of the unoxidized manganese remaining so that the increment of manganese oxidation obtained by the treatment is less for each succeeding step. Thus, if the partially oxidized material contains 69% $MnO_2$ and 20.3 MnO, as in Example V, the first treatment will leave about 12% MnO, the second about 8% and the third about 6%. After these three treatments, the state of oxidation of the manganese will be about $MnO_{1.92}$.

The amount of $CO_2$ required is the stoichiometric equivalent of the MnO present. However, as the reaction is slow, an excess of at least 50% is passed through the slurry. The carbonation process can be considerably expedited by conducting it under a pressure of several atmospheres. As illustrative of this embodiment of my invention, I give the following examples:

Example VI

I take 100 grams of the product of Example I containing 65% $MnO_2$. This is made into a slurry with water containing 20% solids. It is carbonated by passing $CO_2$ through the violently agitated slurry for 15 minutes at such a rate that 50% excess over the stoichiometric equivalent of the 22.1% MnO present in the sample is passed through the solution. The slurry is then filtered, washed, dried and reoxidized. The resulting product contains 75.9% $MnO_2$ and 58.0% Mn. This gives a ratio of Mn as $MnO_2$/Mn of 82.8%. An additional carbonation and reoxidizing gives a product having a ratio Mn as $MnO_2$::Mn of 89.7%. This product contains 2.2% $H_2O$.

Example VII

I take 100 grams of the product of Example II containing 64% $MnO_2$. I make this into a slurry with water and pass in $CO_2$ under 200 pounds/square inch pressure with agitation. I allow the reaction to proceed until no further $CO_2$ is absorbed. This takes only about 10 minutes. The carbonated product is filtered, washed and dried. It is then heated in air for 24 hours at 470° F. and the carbonation and oxidation procedures repeated. The final product analyzes as follows:

| | Per cent |
|---|---|
| Mn | 62.8 |
| $MnO_2$ | 90.8 |
| MnO | 7.0 |
| $H_2O$ | 4.5 |

State of oxidation $MnO_{1.915}$.

The water content recorded in these analyses is determined by heating the sample air dried at 105° C. to 800° C. in air dried over calcium chloride and absorbing evolved water in calcium chloride. The water content for the product of this invention ranges from 1.8–4.5%, depending on the particle size of the final product. The smaller the particle size, the higher the water.

The pH of the battery oxide prepared according to the method described, as determined by the standard method of the Signal Corps, ranges from 7–9. It is accordingly well within the requirement of a pH higher than 4.0.

My invention for the improvement of the manganese dioxide content of materials containing essentially $MnO_2$ and MnO in a ratio of at least one molecule of $MnO_2$ to one of MnO by carbonation and oxidation by heating in air is applicable to such mixtures formed in other ways than the heating of carbonate as set forth in the preceding examples.

Such mixtures of MnO and $MnO_2$ may, for example, be formed by partially reducing natural or artificial $MnO_2$. This may be accomplished by heating in air or in a reducing gas. The lower the temperature at which such partial reduction is carried out, the easier is the carbonation. As illustrative of this embodiment of my invention, I give the following examples:

Example VIII

I take 100 grams of pure $MnO_2$ made by the decomposition of manganese nitrate. I heat this for 5 minutes at 400° C. in a stream of hydrogen. The resulting product analyzes 60.2% $MnO_2$. I make a slurry of this product with 80% water and pass in $CO_2$ with stirring under 100 pounds per square inch pressure until no further $CO_2$ is absorbed. The carbonated material is washed, dried and heated at 470° F. for 24 hours. The carbonation and heating steps are repeated once.

The final product dried at 105° C. has the following analysis:

| | Per cent |
|---|---|
| Mn | 62.8 |
| $MnO_2$ | 90.8 |
| MnO | 7.0 |
| $H_2O$ | 2.2 |

State of oxidation $MnO_{1.915}$.

*Example IX*

I take 100 grams of a natural manganese ore containing 90.5% $MnO_2$ —200 mesh. I heat this for 5 minutes in air at 750° C. The resultant product contains 78.1% $MnO_2$. I make a slurry of this product with 80% water and pass in $CO_2$ with stirring until no further $CO_2$ is absorbed. This product is filtered, washed and dried and heated in air for 24 hours at 470° F. The resulting product contains 88.2% $MnO_2$.

The properties of such manganese dioxide, particularly as they relate to its value as a battery oxide, depend especially on its particle size. This, in turn, is determined by the particle size of the carbonate from which it is prepared. In carrying out my invention I prefer to control the crystal size of the manganese carbonate. This I can do by precipitating the carbonate from the complex formed by dissolving MnO in solutions of ammonia and ammonium carbamate-carbonate mixtures. This may be done by either dilution or heating, both of which shift the equilibrium from carbamate to carbonate. The higher the temperature and the greater the concentration of ammonia and ammonium carbonate in the solution from which the carbonate is precipitated, the larger will be the crystal size.

The following examples are given as illustrative of this embodiment of my invention:

*Example X*

I take 100 grams of MnO and dissolve it in a solution containing 500 grams $NH_4OH$ and 75 grams $CO_2$ per liter. The solution is filtered to remove any residue and heated in an open container until substantially all the manganese has been precipitated as carbonate. The carbonate is filtered, washed with water and dried. It is stable in air and has the following analysis:

| | Per cent |
|---|---|
| Mn | 44.3 |
| $CO_2$ | 43.6 |
| $H_2O$ | 7.3 |

The crystal size is about 2 microns average diameter.

*Example XI*

I make the same solution as in Example X but instead of heating in an open vessel, I heat the solution in a pressure-tight vessel to 90° C. for one hour. Ninety-five percent of the manganese in the solution is precipitated as carbonate. This carbonate is filtered and washed. It is stable in air and has the following analysis:

| | Per cent |
|---|---|
| Mn | 44.8 |
| $CO_2$ | 44.1 |
| $H_2O$ | 6.3 |

The crystal size is about 5 microns average diameter.

*Example XII*

I prepare the solution as in the previous two examples. I then dilute it with an equal volume of water and heat in a closed vessel for 6 hours at 75° C. Eighty-five percent of the manganese is precipitated as carbonate. The carbonate is filtered, washed with water and dried. It is stable in air and has the following analysis:

| | Per cent |
|---|---|
| Mn | 44.0 |
| $CO_2$ | 43.3 |
| $H_2O$ | 7.9 |

The crystal size is 0.25 micron average diameter.

Regardless of the particle size, the manganese dioxide of my invention has new and important properties making it valuable as a battery oxide. The electrical resistance of the battery oxide of my invention is less than that of heretofore known battery oxides. The specific resistance of the product of this invention varies from about 2000 to about 6000 ohm cm. For the purpose of comparison I have made measurements in the same way on Gold Coast ore of battery grade and fined a resistance of 80,000, 30,000 for ores activated by acid leaching, 500,000 for precipitated amorphous oxides and 10,000 to 12,000 for electrolytically prepared battery oxides.

It should be understood that the high electrical conductivity of the battery oxide is only obtained if all the steps of any embodiment of my invention are carried out. For example, the oxidation of manganese carbonate in accordance with my process does not yield a highly conducting oxide. The high conductivity is only conferred by the second step of leaching with acid or carbonating and reoxidizing. Carbonation and reoxidation is especially effective in this connection. Such treatment in a typical example decreases the specific resistance from about 100,000 ohms to 3,000 ohms.

The battery oxide of my invention is characterized by the so-called $\gamma$ structure as determined by X-ray spectrometry. Lattice parameters and intensities of a typical product of the present invention are as follows:

| $d$, Ångstroms: | Intensity, relative |
|---|---|
| 4.35 | 1 |
| 3.63 | 3 |
| 2.84 | 1 |
| 2.40 | 8 |
| 2.12 | 7 |
| 1.63 | 10 |
| 1.43 | 3 |
| 1.35 | 1 |
| 1.30 | 2 |
| 1.16 | 1 |
| 1.00 | 2 |

Examination of the product by the electron microscope shows anhedral rounded somewhat porous particles of approximately uniform size.

The relationship of initial battery discharge capacity to particle size for the battery oxide of this invention is shown in the following table:

| Particle Size | Size Cell | Discharge Resistance, Ohms | End Voltage | Average Initial Capacity | Average Capacity After 3 Mos. |
|---|---|---|---|---|---|
| *Micron* | | | | | |
| 0.25 | "A" | 166.2/3 | 1.13 | 110.0 | 90.0 |
| 2.0 | "A" | 166.2/3 | 1.13 | 95.0 | 93.8 |
| 5.0 | "A" | 166.2/3 | 1.13 | 88.0 | 88.0 |

The cells were of standard Le Clanche type. The tests were at 70° F.

What is claimed is:

1. The method of producing a manganese oxide suitable for depolarization of dry cells which includes the steps of partially oxidizing completely crystalline precipitated manganese carbonate of a particle size .25 to 6 microns by heating in an atmosphere containing oxygen to a temperature from 300° to 600° F. carbonating said oxidized carbonate by treatment with carbon dioxide and water, and then further oxidizing the carbonated product by heating to a temperature of 300° to 600° F. in an atmosphere containing oxygen.

2. Process of improving the battery grade of a manganese oxide product corresponding in oxygen content to a mixture of $MnO_2$ and $MnO$ in which the molecular ratio of $MnO_2$ to $MnO$ is at least 1:1, which comprises carbonating the manganese oxide product by treating the same in the presence of water with carbon dioxide in an amount substantially in excess of the stoichiometrical equivalent of the calculated $MnO$ content of the starting material, and subjecting the carbonated product to oxidation treatment by heating it to a temperature of from 300° to 600° F. in an atmosphere containing free oxygen substantially to increase the oxygen content of the product.

3. The process defined in claim 2, in which the carbonation step is conducted under a pressure of several atmospheres.

4. The process defined in claim 2, in which the carbonation and re-oxidation steps are repeated at least once.

ABRAHAM L. FOX.

REFERENCES CITED

The following references are of record in the file of this patent:

UNITED STATES PATENTS

| Number | Name | Date |
|---|---|---|
| 1,275,566 | Ellis et al. | Aug. 13, 1918 |
| 1,293,463 | Kaplan | Feb. 4, 1919 |
| 1,448,110 | De Olaneta | Mar. 13, 1923 |
| 1,761,133 | Laury | June 3, 1930 |
| 1,889,021 | Kobe | Nov. 29, 1932 |
| 1,947,457 | Bradley | Feb. 20, 1934 |
| 1,988,799 | Kato | Jan. 22, 1935 |
| 2,123,250 | Muller et al. | July 12, 1938 |